(12) United States Patent
Gabrys

(10) Patent No.: US 6,486,627 B1
(45) Date of Patent: Nov. 26, 2002

(54) FLYWHEEL UNINTERRUPTIBLE POWER SOURCE

(75) Inventor: Christopher W. Gabrys, Federal Way, WA (US)

(73) Assignee: Indigo Energy, Inc., Napa, CA (US)

(*) Notice: Subject to any disclaimer, the term of this patent is extended or adjusted under 35 U.S.C. 154(b) by 0 days.

(21) Appl. No.: 09/887,976

(22) Filed: Jun. 21, 2001

Related U.S. Application Data

(60) Provisional application No. 60/214,018, filed on Jun. 23, 2000.

(51) Int. Cl.$^7$ .............................. H02K 7/02; H02J 9/00
(52) U.S. Cl. ........................ 318/161; 318/150; 307/68; 322/4
(58) Field of Search ................................ 318/140, 150, 318/161; 322/4; 307/64–68

(56) References Cited

U.S. PATENT DOCUMENTS

| | | | |
|---|---|---|---|
| 5,646,458 A | * 7/1997 | Bowyer et al. | 307/67 |
| 5,669,294 A | * 9/1997 | Klemm et al. | 100/35 |
| 5,705,902 A | 1/1998 | Merritt et al. | |
| 5,767,591 A | * 6/1998 | Pinkerton | 307/64 |
| 5,811,960 A | * 9/1998 | Van Sickle et al. | 322/4 |
| 5,932,935 A | * 8/1999 | Clifton et al. | 307/60 |
| 5,969,457 A | 10/1999 | Clifton et al. | |
| 6,133,716 A | * 10/2000 | Schutten | 322/40 |
| 6,262,505 B1 | * 7/2001 | Hockney et al. | 310/90.5 |

FOREIGN PATENT DOCUMENTS

WO  WO 98/43341  10/1998

* cited by examiner

*Primary Examiner*—Bentsu Ro
(74) *Attorney, Agent, or Firm*—J. Michael Neary

(57) ABSTRACT

A flywheel uninterruptible power source has a charging system that uses a high frequency pulse width modulated inverter inside the motor drive with a very low frequency, line commutated converter that regulates by switching the alternating current from the utility power at frequencies under 200 Hz and 60 Hz. The placement of the motor power regulation switching is moved from the motor drive preferably to the input AC line current that provides power to charge the flywheel system. The switching is preferably done using natural commutation so that the devices are turned off when the current passes through zero for very low loss and device stresses. Preferable devices for switching include thyristors or triacs. The turn on switching can be accomplished using phase angle firing or in one embodiment zero cross over switching is employed to reduce harmonic distortion and radio frequency interference to the primary source.

27 Claims, 7 Drawing Sheets

FLYWHEEL UNINTERRUPTIBLE POWER SOURCE

This is related to U.S. Provisional Application No. 60/214,018 filed on Jun. 23, 2000 and entitled "High Efficiency Flywheel Power Input Circuit".

This invention pertains to a flywheel uninterruptible power source and more particularly to a flywheel energy charging system that provides increased life, reliability and efficiency over previous designs. The charging system also includes a safety mechanism that prevents operation of the flywheel when the vacuum surrounding the flywheel is degraded.

BACKGROUND OF THE INVENTION

Flywheel uninterruptible power supplies have emerged as an alternative to electrochemical batteries for prevention of power interruptions to critical loads. Electrochemical batteries used in these applications, in particular, valve regulated lead acid batteries, have many undesirable traits. The life of batteries is short, typically between 1 to 7 years depending on the environment and use. They require periodic maintenance and inspection, are subject to thermal degradation and can fail unpredictably. Lead acid batteries and other types as well are also environmentally noxious. However, lead acid batteries are relatively inexpensive. Flywheel systems show promise to eliminate the disadvantages of batteries with the expectation of achieving 20 year lives with minimal or no maintenance, temperature insensitivity, previously unachievable reliability while being environmentally benign.

A flywheel uninterruptible power source is shown in FIG. 1. The power source 10 includes a high-speed flywheel 12, in which energy is stored in the form of rotating inertia. Flywheels can be either constructed of metal or of composite materials. The flywheel is supported for rotation using upper and lower bearings 14 and 15. The flywheel can be supported on mechanical bearings, magnetic bearings or a combination. An attached motor/generator 16 is used to accelerate and decelerate the flywheel 12 for storing or retrieving energy. Many designs of motor/generators exist and can be employed. Motor/generators can also be made as separate components. To reduce the losses from aerodynamic drag, the interior 13 of the housing 11 surrounding the flywheel 12 is maintained at a low pressure, or for slower flywheels it can be filled with a gas of small molecule size such as helium. The flywheel uninterruptible power supply 10 includes electrical connection for operation and conversion of power. Utility power 21 is input to the input conversion 20 and power is supplied to a critical load 19 through output conversion 18. A system control 17 provides control for the system 10. The system control 17 controls the operation of the flywheel 12 by limiting currents 22, controlling speed 23 and also by monitoring parameters through diagnostics 24.

Regardless of the physical design employed, the operating life of the power source and its components is preferably maximized in order to offset the higher initial cost of the flywheel system over batteries by actually becoming cheaper when considered over the life of the power source. One element of flywheel uninterruptible power supplies that deserves particular attention is the power system electronics. Designing electronics for an operating life that is preferably greater than 10–20 years without failures is challenging.

A power system configuration of previous flywheel uninterruptible power supplies is shown in FIG. 2. The power system 30 takes in utility power 31 and supplies protected direct current power at the output 32. For many telecommunications systems such as telephone and wireless, the output voltage 32 required is −48 volts or 24 volts. For other applications, such as high power ride-through for data centers or critical manufacturing, the input and output voltages are higher. The input voltage 31 is rectified to a DC bus 34 using a rectifier 33 which can be either controlled or uncontrolled. The DC bus 34 supplies power to a PWM (pulse width modulated) inverter 36 also known as a servo amplifier. The servo amplifier 36 converts the DC current in the bus 34 to synchronous alternating current 37 that provides power to the flywheel motor/generator to accelerate the flywheel to normal operating speed. When the utility power is operating normally, the DC voltage in the bus 34 is converted to the output voltage 32 using a DC-DC converter 35.

During an interruption in the utility power 31, energy from the rotating flywheel supplies power to the output 32 by providing power to the DC bus. The inverter 36 provides power to the DC bus instantly and automatically when the utility power is discontinued typically by the antiparallel diodes included with the H-bridge, not shown, inside the inverter 36 or through use of a paralleled separate rectifier, not shown. Power automatically flows back and is rectified to the DC bus whenever the generator voltage is greater than the DC bus 34. As the flywheel speed slows, the voltage to the DC bus drops. The output DC-DC converter 35 maintains the constant output voltage 32 during discharging of the flywheel.

The charging of the flywheel uninterruptible power source 30 is regulated through use of the PWM inverter 36. The PWM inverter uses high frequency (~20 kHz) switching that chops the DC bus voltage 34 into varying width pulses that are combined to provide regulation that results in current control and speed control for the flywheel. The high frequency switching yields in several trillion cycles on the semiconductor switches in the inverter over a 20 year system life. The high number of switching cycles of the direct current stresses the inverter and could potentially result premature failures of the flywheel power source. The diagnostics of the flywheel system can also potentially have components with operating lives of concern. This is especially true if vacuum monitoring gauges are used. Vacuum gauges such as ion and thermocouple gauges are unlikely to last for the life of the power system and also are expensive

SUMMARY OF THE INVENTION

The invention is a flywheel uninterruptible power source having a charging system that provides increased life and reliability compared to previous systems. The charging system works by replacing the current regulation and/or speed control normally accomplished by a high frequency pulse width modulated inverter with a very low frequency, line commutated converter that regulates by switching the alternating current from the utility power. Pulse width modulation inverters or motor drives for high speed motors have typically 3 phase designs that invert a DC input voltage from the supply bus to a high frequency synchronous alternating current that drives the motor. In most applications, the voltage of the DC bus is fixed because it is typically the output of a fixed DC power supply.

The speed control and current control for the motor are achieved by using high frequency (~20 kHz) pulse width modulation inside the motor drive. The very high frequency is required so that the speed of the motor can be held nearly constant and free of pulsations. In contrast, the invention takes into account the very unusual application of flywheel systems. An energy storage flywheel is a unique application for a high-speed motor. The high-speed motor is coupled to a very large rotational inertia for the sole purpose of storing energy. Such flywheels can take 8 hours or more to accelerate from stopped to 30,000 rpm. Because of the large inertia coupled to the high-speed motor, speed fluxuations and pulsations are not an issue. Regardless of any torque pulsations, the only goal is to store energy in the rotating flywheel and if the energy is added in pulses, it makes no difference because the energy is being added. Therefore, the disclosed invention makes use of the uniquely stable rotational speed of energy storage flywheels by reducing the speed regulation frequency to conventional line current frequencies, frequencies under 200 Hz and 60 Hz in particular.

By reducing the switching frequency, the switching losses are reduced and the life and reliability of the switches are greatly extended. The switching losses are linearly proportional to the switching frequency. The drawback of the lower frequency switching is increased size of the inductor and capacitor filter components, however the increased life is more important for flywheel systems. The larger filter components can also be included inside the already large and heavy flywheel unit. The placement of the motor power regulation switching is moved from the motor drive preferably to the input AC line current that provides power to charge the flywheel system. The switching is preferably done using natural commutation so that the devices are turned off when the current passes through zero for very low loss and device stresses. Preferable devices for switching include thyristors or triacs. The turn on switching can be accomplished using phase angle firing or in one embodiment zero cross over switching is employed to reduce harmonic distortion and radio frequency interference to the primary source.

In another embodiment, the direct current voltage that is supplied to the inverter controlling the motor is increased by 1.5 times or more than if the primary source voltage was directly rectified. The advantage of increasing the voltage sent to the inverter is that the resistive losses in the motor/generator and other components can be reduced, the wire size and vacuum wire feedthrough sizes can be reduced and depending of the output conversion method, more energy can be extracted from the flywheel by allowing it to be discharged over a greater range of speed. The voltage can be simply increased by a use of a voltage multiplier rectifier and a version of voltage doubling rectifier can also allow for dual voltage installation. Alternatively, the voltage can be increased using a step up transformer, which has the benefit of providing isolation for the flywheel system.

In yet another embodiment, the charging system of the flywheel uninterruptible power source prevents acceleration of the flywheel if the drag is determined to be above a certain level. This is an important safety feature in preventing the flywheel from overheating. Drag can be caused by the bearing system, inadequate vacuum level or other sources. The charging system can measure the drag on the flywheel through the acceleration at a given speed and charging current. The threshold level of drag that signals to prevent accelerations can increase as the speed increases. By this method, the rotating flywheel can detect the level of vacuum and importantly can detect if the vacuum level is insufficient prior to acceleration to high speeds. This is particularly important for composite flywheels which can easily over heat and fail with a poor vacuum due to the high speed and low thermal capability and conductivity. Alternatively, the flywheel drag can be found by the level of current required to maintain a certain speed. The advantage of determining drag from the flywheel's performance is that conventional vacuum gauges can be eliminated and the life of the system greatly increased. Vacuum gauges such as thermocouple and ion gauges are expensive and not robust. The invention is applicable for use in types of flywheel systems including long term and short term, high power and low power flywheel uninterruptible power sources.

DESCRIPTION OF THE PREFERRED EMBODIMENT

Figure 1:
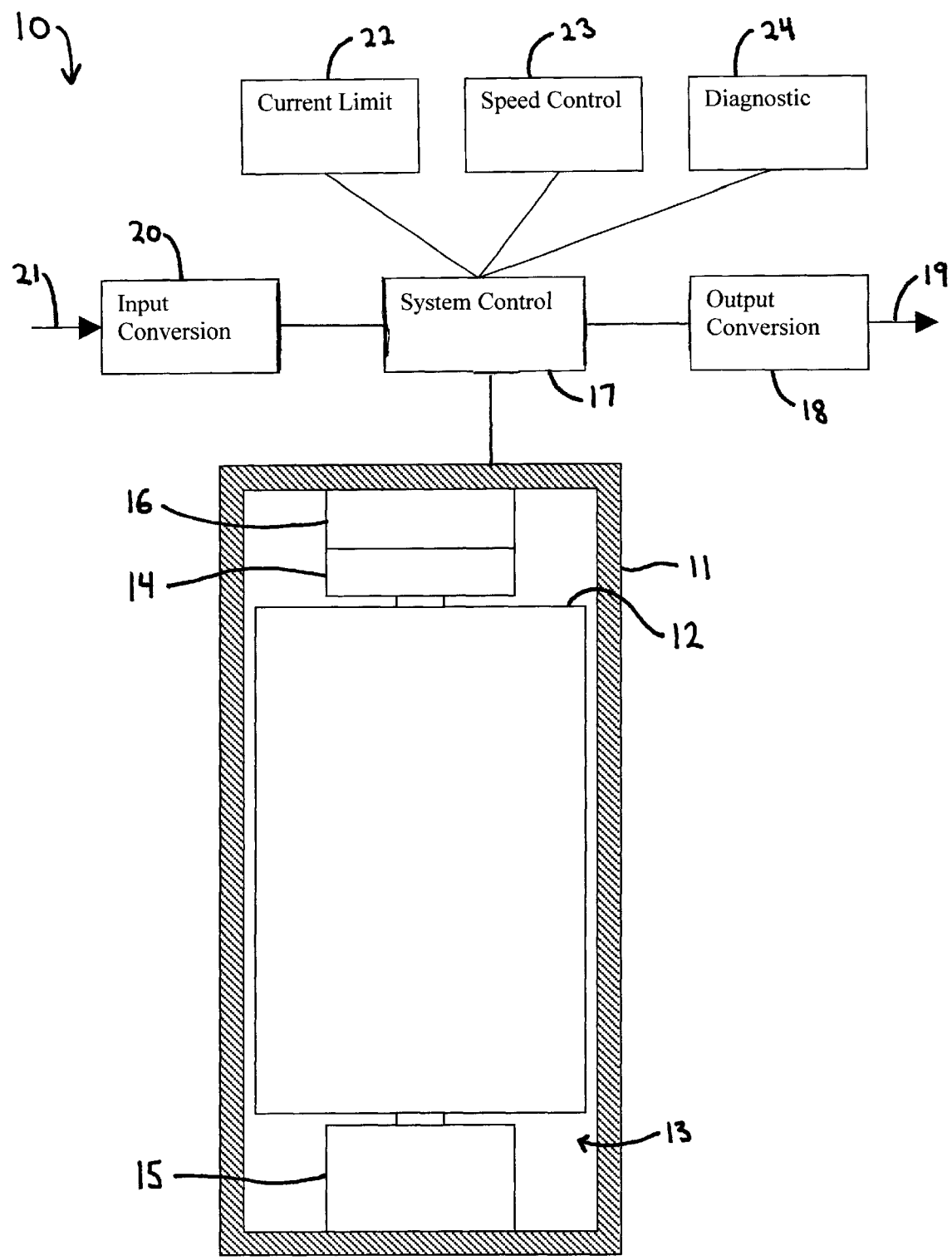
FIG. 1 is a schematic elevation of a flywheel uninterruptible power source.
Figure 2:
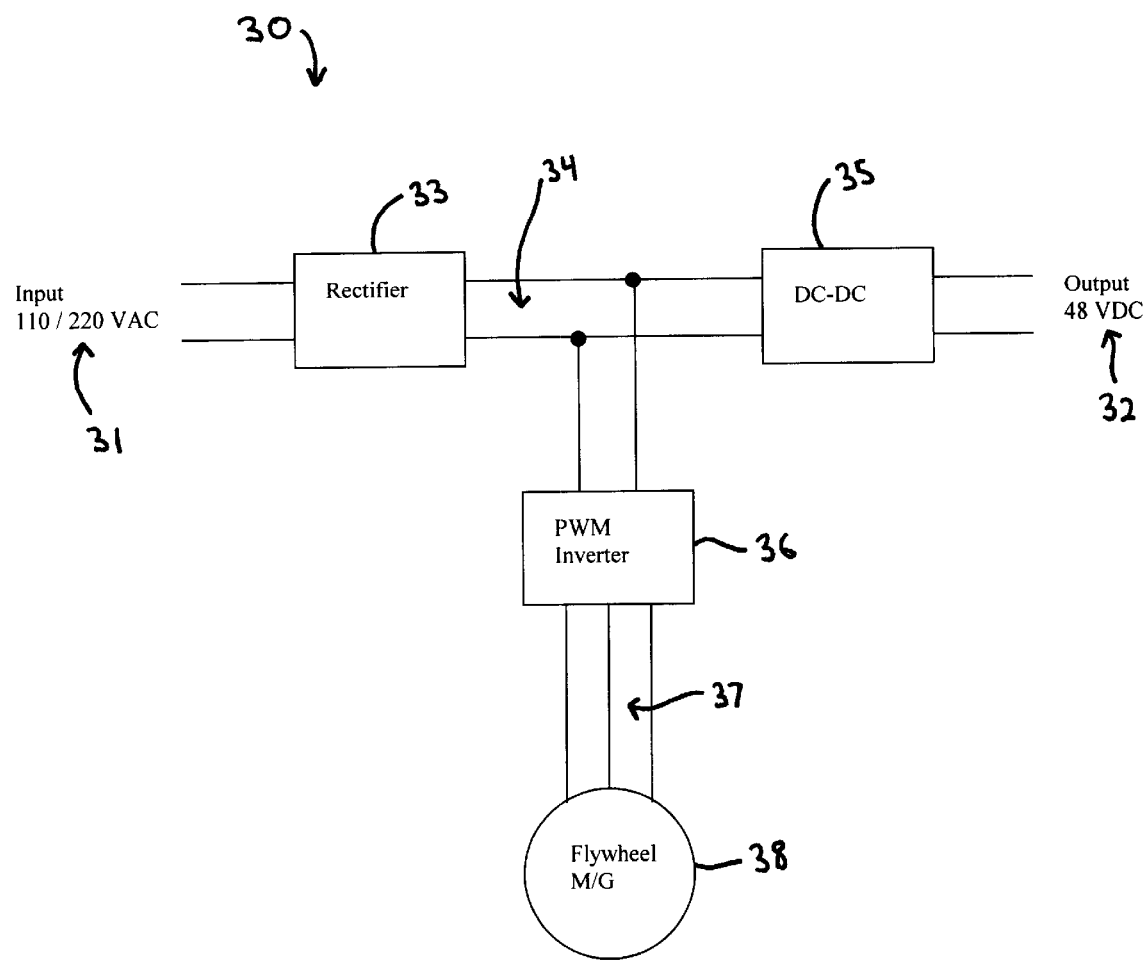
FIG. 2 is a schematic diagram of a power system for a flywheel uninterruptible power source, prior art.
Figure 3:
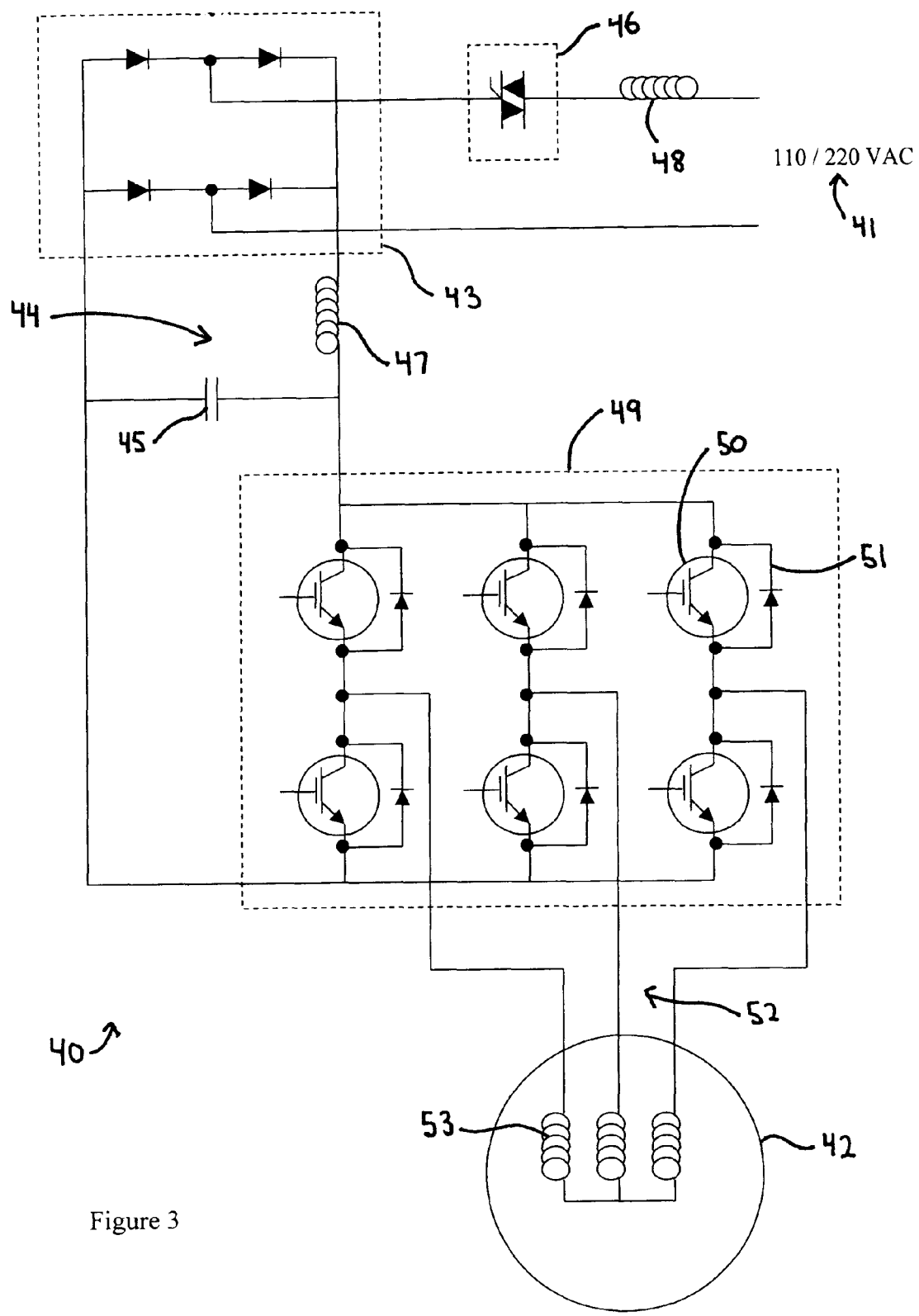
FIG. 3 is a schematic diagram of a flywheel energy charging system in accordance with this invention.

Turning to the drawings, wherein like reference numerals designate identical or corresponding parts, FIG. 3 shows a charging system 40 for a flywheel uninterruptible power source shown generically in FIG. 1. The charging system 40 inputs power from a primary source 41 such as utility power and use it to accelerate the flywheel motor/generator 42. When the utility power is operative, the input power 41 is regulated and converted to the DC bus 44, which powers an inverter 49 for driving the motor 42. During an interruption of primary power 41, the generator 42 supplies power to a critical load, not shown, using a discharging circuit, also not shown, either connected to the DC bus 44 or from the generator itself. In accordance with the invention, the regulation of the power to the motor 42 occurs using line frequency switching prior to the DC bus 44. Although many types of flywheels exist and could be used with the invention, flywheels constructed of steel show a high level of promise for storing energy at low cost and are preferred. Steel flywheels offer more well established manufacturing and processes and they outgass much less inside the vacuum container of flywheel uninterruptible power supplies. A brushless permanent magnet motor/generator is preferably used for the highest efficiency although other less efficient types such as reluctance or induction motors could be used. A separate motor and generator could also be used but this less preferable due to added cost and complexity. In order to reduce the number of electrical connections in the flywheel system and the number of electrical feedthroughs into the vacuum, the inverter is preferably sensorless in that synchronization with the motor is achieved without the use of added position sensors.

The charging system 40 works by switching the input power 41 to provide regulation for current control and or speed control to the motor 42. Unlike previous high speed motor drives that use high frequency pulse width modulation, the charging system 40 switches at twice the frequency of the input power 41 (typically 60 Hz) or less, thereby resulting in drastically reduced switching cycles over the life of the flywheel power source. In the configuration shown, the input power 41 is regulated by the switching of a triac 46 and the output is fed into a full bridge rectifier 43 that converts the AC pulses into DC pulses. The DC pulses at the DC bus 44 are smoothed and filtered using a capacitor 45 and inductor 47. Inductors 47 and 48 serve to improve the power factor and to reduce harmonics reflected back into the utility power 41. Other filtering power factor correction circuit configurations are well known in the art and could also be used. The charging system shown uses single phase AC input power, however it can also be implemented with three phase power by expanding the number components. The power from the DC bus 44 is used to accelerate the flywheel motor 42 through use of a synchronized inverter 49. A standard design of inverter is shown with an H-bridge configuration. The inverter 49 is comprised of 6 switch devices 50 that are switched to provide three phase power 52 to the motor 42. The switching devices can be of various types of transistors however IGBTs are commonly used because of their characteristics. The IGBT's 50 produce synchronous AC with the motor 42 by using firing circuitry, not shown, that determines the rotational position of the motor. The rotational position can be found through use of sensors such as optical or magnetic or by using the induced voltages in the motor coils 53 themselves. When the power is switched off to a given coil 53, the inductive energy is prevented from excessively stressing the inverter switches 50 through the use of antiparallel diodes 51. The diodes also provide a path for the generator voltage back to be rectified back the DC bus 44 whenever the generator voltage is greater than the DC bus voltage 44, such as during a loss of utility power 41. A separate rectifier, not shown, could also be connected between the generator 42 and the DC bus 44 for this function. If a magnetic bearing system is employed for support of the flywheel, the magnetic bearing control is thus preferably powered from connection to the DC bus. A wide input range DC-DC converter, not shown, is used to provide constant power to the control over the entire operating speed range of the flywheel.

The switching regulation occurring at the very low frequency has the disadvantage of requiring much larger filtering inductors and capacitors to achieve smooth DC power. The goal of most modern motor control and power conversion has been increasing the switching frequency to reduce component size and potentially cost. The flywheel power source is however a unique application. The system is expected to operate continuously for a very long period of time and with preferably no failures or maintenance. Operation of the power conversion electronics at low frequency is preferably done to reduce the number of cycles on the switching devices. The switching of the devices is also preferably done in a way with reduced stress. The charging circuit takes advantage of the alternating current nature of the charging power source and switching is done by natural commutation such that the switches are turned off at the point of zero current. Thus no stored inductance energy is discharged across the devices, further extending the life. The flywheel uninterruptible power source is also a very unique application for high speed motors. The motor is attached to an extremely large inertia. The acceleration of the flywheel to full speed can take as long as 8 hours or more. Normally switching regulation of high speed motors is purposely done at high frequency to prevent speed fluctuations or pulsations of torque. Because of the large inertia of the flywheel, speed fluctuations are not an issue. Likewise, any pulsations of torque are not of concern. The flywheel is used for storing energy and if energy is added in pulses, it makes no difference. Therefore, obtaining a perfectly smooth DC voltage provided to the DC bus is not needed. This reduces the requirements for the filter inductance and capacitance. The lower switching frequency also reduces the switching power loss of the charging system.

Figure 4:
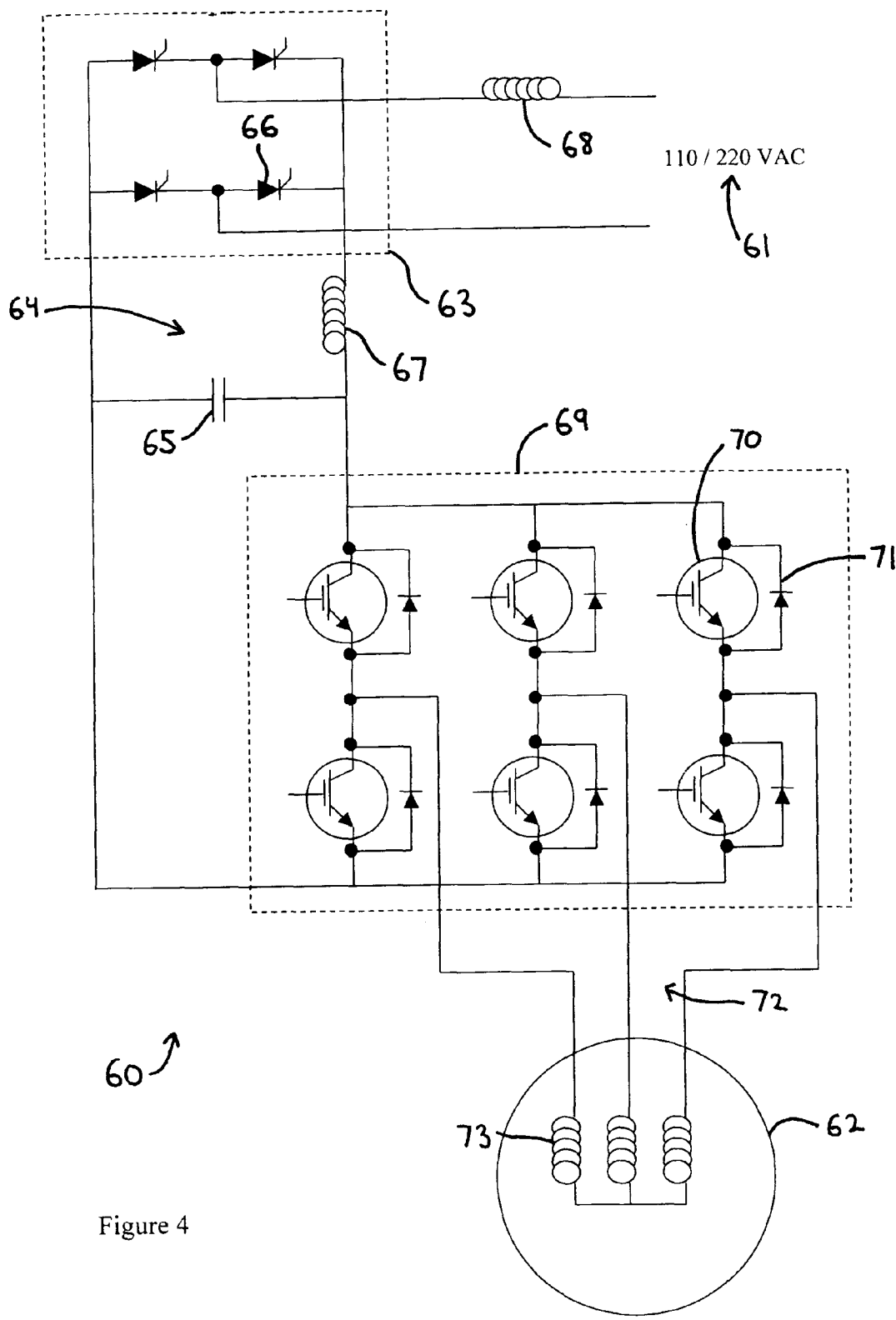
FIG. 4 is a schematic diagram of an alternate flywheel energy charging system in accordance with this invention.

An alternate configuration of charging system is shown in FIG. 4. The charging system 60 inputs an alternating current power 61 and accelerates the flywheel motor 62. The input power is switched and rectified using a controlled rectifier 63 that outputs DC power to the DC bus 64. A filter capacitor 65 and inductor 67 smooth the DC voltage 64. Inductors 67 and 68 reduce harmonic distortion and increase the power factor. The controlled bridge rectifier 63 replaces diodes of the previous charging system with thyristors. The thyristors provide both the switching and rectification. They are also naturally commutated meaning that they turn off automatically when the current through each is essentially zero. This results in reduced stress, increased life and higher efficiency. The DC bus 64 is connected to the motor inverter 69 that generates three phase AC power 72 to operate the motor 62. The inverter consists of multiple switches 70 that are switched in pairs to provide power to the motor coils 73. Antiparallel diodes 71 prevent damage to the switches 70 from stored inductive energy and they allow return of the generator power 72 back to the DC bus 64.

Figure 5:
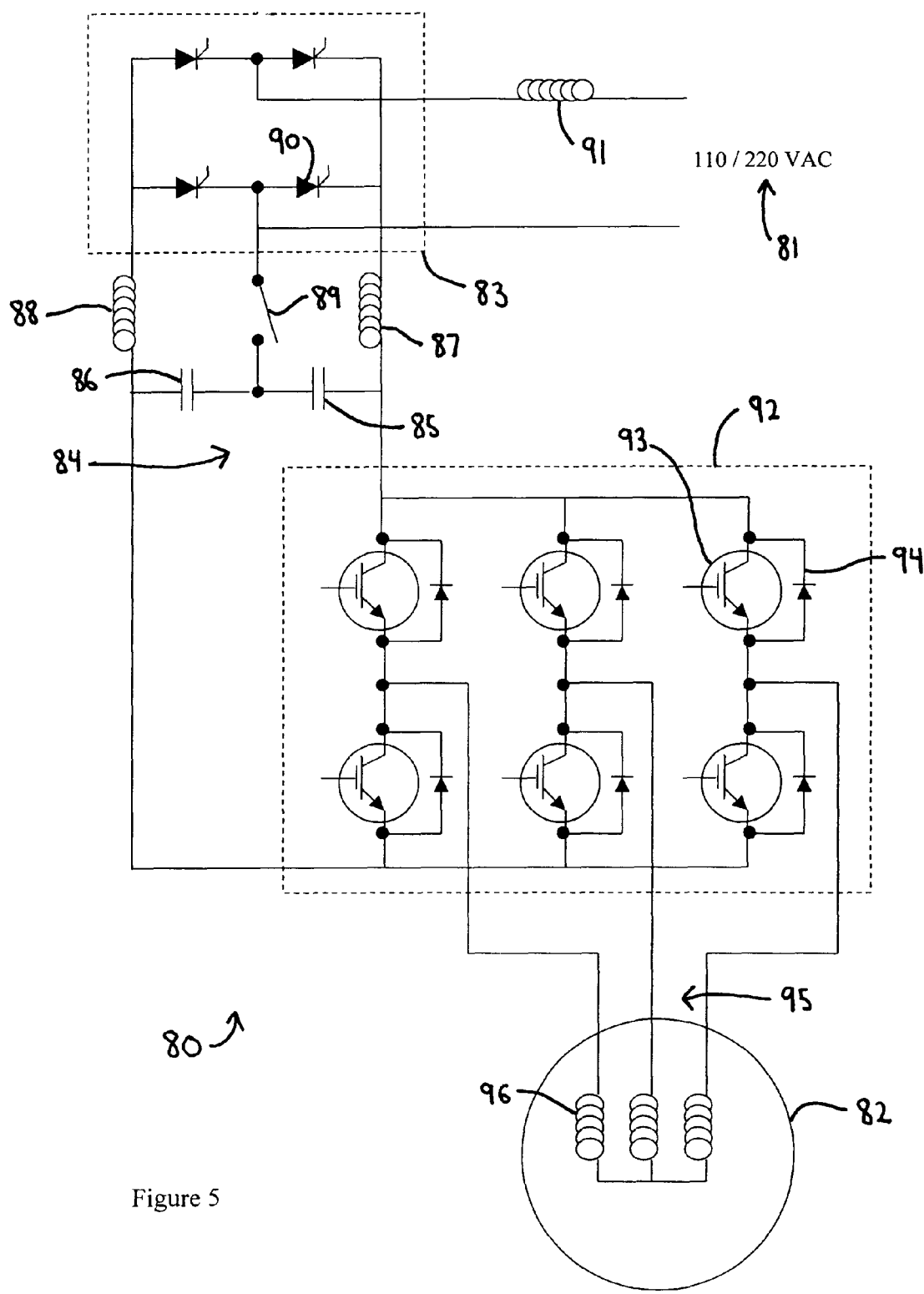
FIG. 5 is a schematic diagram of a second alternate flywheel energy charging system in accordance with this invention.

A second alternate configuration of charging system for a flywheel uninterruptible power source is shown in FIG. 5. The charging system 80 inputs alternating current power 81 as before from utility power or an auxiliary generator source and accelerates the flywheel motor 82. The AC power is switched and rectified through the use of a controlled bridge rectifier 83 that outputs DC power to the DC bus 84. In this configuration, the voltage is increased through the use of a voltage multiplier rectifier design. The rectifier 83 doubles the voltage supplied to the DC bus 84 by using two capacitors 85 and 86 that are charged separately by a center connection to the primary AC voltage 81. The advantage of increasing the voltage to the DC bus is that the motor/generator and other components can be operated a lower current. Resistive heating losses can be reduced as well as the wire size requirement and the size of the electrical feedthroughs connecting into the vacuum. A further benefit of operating at a bus voltage preferably 50% or more higher than would be achieved from direct rectification is that the flywheel system can potentially provide more energy. Depending on the output conversion method and connection employed, the higher bus voltage can allow for more energy to be extracted from the flywheel by discharging over a wider speed range. A step up transformer, not shown, could also be used for this function with the added benefit of providing isolation. The voltage doubler rectifier configuration also can be used for increased versatility by providing for dual voltage installation. In this case, a switch 89 is opened when the primary voltage is a low voltage source and closed when the flywheel system is connected to a high voltage source. The capacitors 87 and 88 also provide smoothing of the DC bus 84 and inductors 87 and 91 reduce current distortion. The DC bus 84 is connected to the motor inverter 92 that generates three phase AC power 95 to operate the motor 82. The inverter uses of multiple switches 93 that are switched in pairs to provide power to the motor coils 96. Antiparallel diodes 94 prevent damage to the switches 93 from stored inductive energy and they allow return of the generator power 95 back to the DC bus 84. Other inverter configurations could also be used with the invention as well as motor drive circuits that switch only single direction current to the coils 96.

Figure 6:
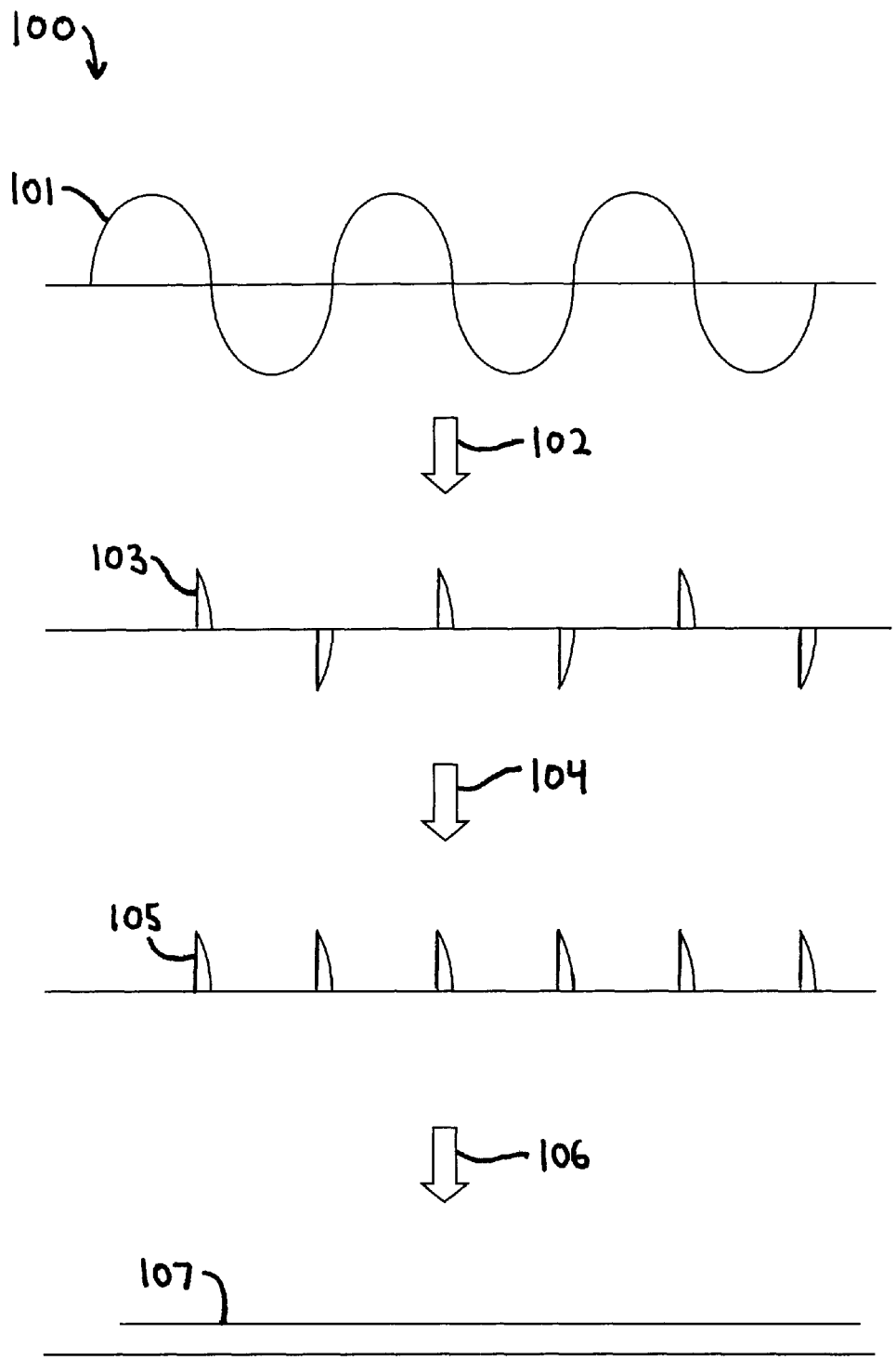
FIG. 6 is a process flow diagram of a process of charging a flywheel uninterruptible power source using phase angle firing in accordance with the invention.

The firing of the triacs or thyristors of the charging system can be conducted multiple ways. One way to regulate the output power is to use phase angle firing. The process of input power regulation with phase angle firing in accordance with the invention is shown in FIG. 6. The process 100 takes the alternating current from the utility 101 and switches 102 at the power at a delayed phase angle. The phase angle delay is controlled so that more or less of the input sine wave is switched to the load. A smaller delay angle results in more of the sine wave power being conducted to the DC bus. The combination of the phase angle pieces 103 can include portions from both the positive half cycle and the negative half cycles. These half portions are rectified 104 so that they all become positive portions 105. The portions or pulses of power are then smoothed and filtered 106 to yield a sufficiently smoothed DC bus voltage 107.

Figure 7:
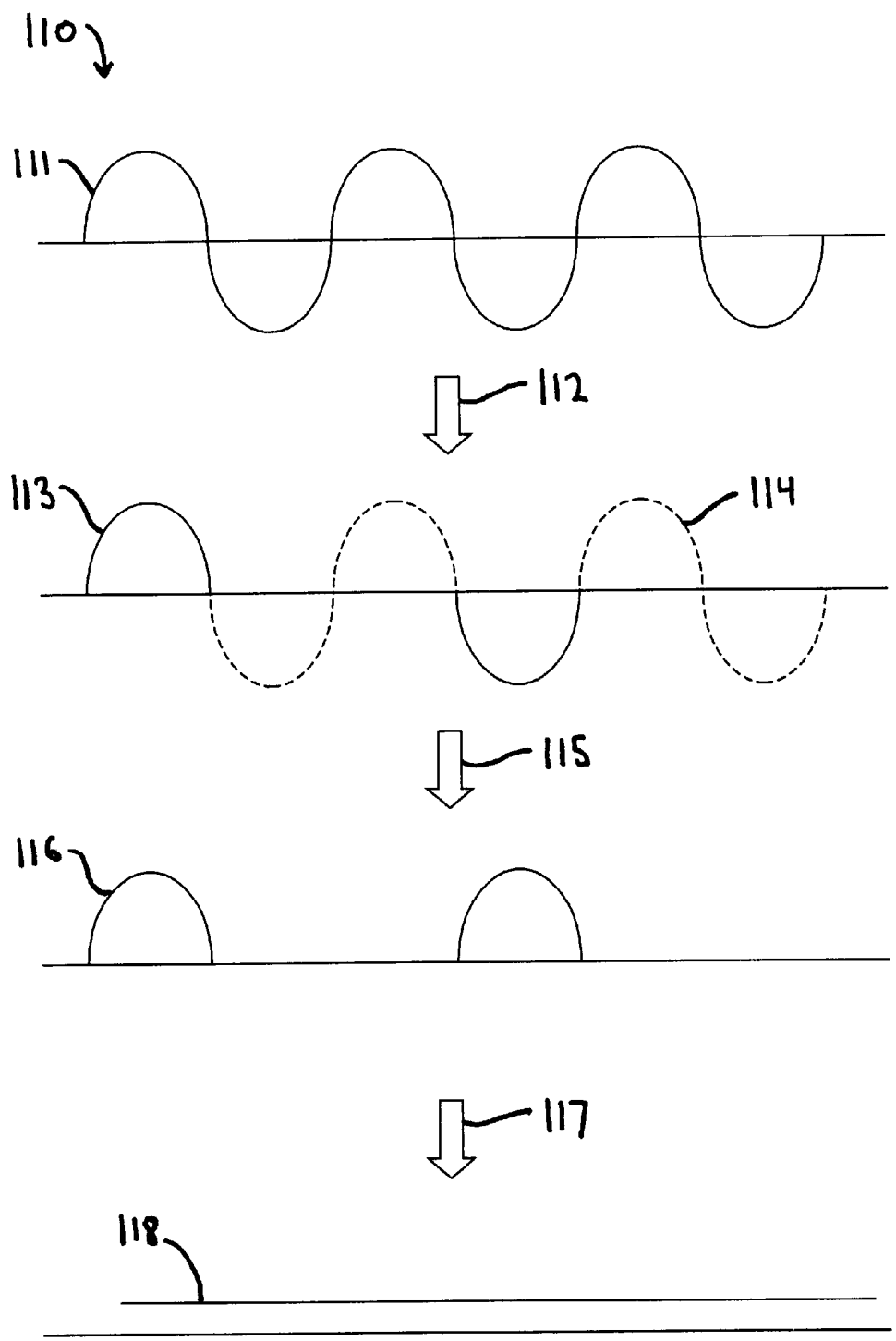
FIG. 7 is a process flow diagram of a process of charging a flywheel uninterruptible power source using zero voltage switching in accordance with the invention.

Phase angle firing can achieve a smooth output with less filtering, however the thyristors are forced to turn on at a non-zero voltage and hence have some losses and stresses. Phase angle firing can also cause generation electromagnetic interference and some harmonic distortion in the utility power. An alternate switching method that can be used is zero crossover voltage firing. A process of power conversion of the primary power showing with zero voltage switching in accordance with the invention is shown in FIG. 7. Zero crossover voltage firing 110 takes the input source alternating current 111 and switches 112 it to the output in half or full sine wave portions. The half sine wave portions 113 are the result of the switching on of the thyristors or triac only when the AC voltage passes through zero. The switching loss is reduced along with the harmonic distortion reflected back into the utility power source and any radio frequency interference generation. To regulate the power, not every half wave 114 is switched to the DC bus. Therefore, when the pulses 113 are rectified and combined 114, the result is a larger pulsed voltage waveform with spaced apart half sine wave portions 116. The portions are filtered 117 to provide a sufficiently smoothed DC bus voltage 118.

Another embodiment of the charging system invention is the use of diagnostic in the flywheel control that monitors the drag on the flywheel and prevents acceleration if the drag becomes too high. The flywheel uninterruptible power source control can measure the drag based on the flywheels acceleration at a given speed and charging current. The charging system then responds by preventing acceleration of the flywheel if the drag is higher than a certain level. The system can also cause the flywheel to be slowed and or an alarm to be triggered. The drag can be the result of aerodynamic, bearing or other losses. The value of drag above which acceleration is prevented can be either a fixed value or in a further embodiment, the value is increased with increasing flywheel speed. This allows a lower threshold at lower speeds. In the case of aerodynamic drag from an insufficient vacuum, which can over heat and fail composite flywheels, the lower drag threshold detects the degraded vacuum at a low speed and prevents acceleration to higher speeds. If the flywheel is running at full speed or some other constant speed, the drag on the flywheel can be determined by the current or power required to maintain that speed. The capability of the charging system to recognized increased drag is especially important for flywheel systems charged directly from AC utility power sources such as with the invention. When the charging is provided from utility power, the power available to accelerate the flywheel can be much higher than if it were charged from a DC telecommunications rectifier, for example. High level primary source power allows the potential for a flywheel to be accelerated despite some malfunction causing increased drag.

Obviously, numerous other modifications, combinations and variations of the preferred embodiments described above are possible and will become apparent to those skilled in the art in light of this specification. For example, many functions and advantages are described for the preferred embodiments, but in some uses of the invention, not all of these functions and advantages would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims, wherein

I claim:

1. A flywheel uninterruptible power source comprised of an energy storage flywheel supported for rotation on a bearing system and accelerated and decelerated using a brushless motor/generator for storing and retrieving energy,
   said flywheel uninterruptible power source prevents interruption of power to an electrical load during an interruption of primary power by supplying power generated from the flywheel generator,
   said flywheel is accelerated to normal operating speed using power from an alternating current primary source,
   said power from said primary source is rectified to direct current power which is supplied to an synchronous inverter that accelerates the motor,
   said direct current power supplied to the inverter is regulated by using switching regulation of the alternating current from the primary source for controlling the acceleration of the flywheel.

2. A flywheel uninterruptible power source as described in claim 1 wherein said switching regulation occurs at zero voltage.

3. A flywheel uninterruptible power source as described in claim 1 wherein said switching regulation occurs at zero current.

4. A flywheel uninterruptible power source as described in claim 1 wherein said switching regulation uses phase angle switching.

5. A flywheel uninterruptible power source as described in claim 1 wherein said switching regulation uses demand oriented transfer zero crossover firing.

6. A flywheel uninterruptible power source as described in claim 1 wherein said switching regulation is done using thryistors.

7. A flywheel uninterruptible power source as described in claim 1 wherein said switching regulation is done using triacs.

8. A flywheel uninterruptible power source as described in claim 1 wherein said direct current power supplied to the inverter also powers magnetic bearings that support said flywheel.

9. A flywheel uninterruptible power source as described in claim 1 wherein said flywheel is supported for rotation using passive radial magnetic bearings.

10. A flywheel uninterruptible power source as described in claim 1 wherein said inverter for accelerating the motor is sensorless.

11. A flywheel uninterruptible power source as described in claim 1 wherein said motor/generator is a permanent magnet synchronous machine.

12. A flywheel uninterruptible power source as described in claim 1 wherein said motor/generator is comprised of a separate motor and generator.

13. A flywheel uninterruptible power source as described in claim 1 wherein said flywheel is constructed mostly or exclusively of steel.

14. A flywheel uninterruptible power source comprised of an energy storage flywheel supported for rotation on a bearing system and accelerated and decelerated using a brushless motor/generator for storing and retrieving energy, said flywheel uninterruptible power source prevents interruption of power to an electrical load during an interruption of primary power by supplying power generated from the flywheel generator, said flywheel is accelerated to normal operating speed using power from an alternating current primary source, said power from said primary source is rectified to direct current power which is supplied to an synchronous inverter that accelerates the motor, said direct current power supplied to the inverter is regulated by using switching regulation at a frequency below 200 Hz for controlling the acceleration of the flywheel.

15. A flywheel uninterruptible power source comprised of an energy storage flywheel supported for rotation on a bearing system and accelerated and decelerated using a brushless motor/generator for storing and retrieving energy, said flywheel uninterruptible power source prevents interruption of power to an electrical load during an interruption of primary power by supplying power generated from the flywheel generator, said flywheel is accelerated to normal operating speed using power from an alternating current primary source, said power from said primary source is rectified to direct current power which is supplied to an synchronous inverter that accelerates the motor, said direct current power is increased to a level 1.5 or more times greater than the voltage of said alternating current primary source.

16. A flywheel uninterruptible power source as described in claim 15 wherein the voltage level of said direct current power is increased by using a voltage-multiplying rectifier with the alternating current primary power.

17. A flywheel uninterruptible power source as described in claim 15 wherein the voltage level of said direct current power is increased by using a step up transformer with the alternating current primary power.

18. A flywheel uninterruptible power source comprised of an energy storage flywheel supported for rotation on a bearing system and accelerated and decelerated using a brushless motor/generator for storing and retrieving energy, said flywheel uninterruptible power source prevents interruption of power to an electrical load during an interruption of primary power by supplying power generated from the flywheel generator, said flywheel is contained inside a low pressure container, said flywheel is accelerated by a charging system that prevents acceleration of the flywheel if drag on said flywheel is above a predetermined level.

19. A flywheel uninterruptible power source as described in claim 18 wherein the drag on the flywheel is determined by the acceleration of the flywheel at a given speed and charging current.

20. A flywheel uninterruptible power source as described in claim 19 wherein a digital signal processor is used to determine if said drag on said flywheel is above said predetermined level.

21. A flywheel uninterruptible power source as described in claim 18 wherein said predetermined level of drag, above which acceleration of the flywheel is prevented, is higher for higher flywheel speeds.

22. A flywheel uninterruptible power source as described in claim 18 wherein the flywheel is slowed if the drag on the flywheel is too high.

23. A flywheel uninterruptible power source as described in claim 18 wherein an alarm is triggered if said drag on said flywheel is above said predetermined level.

24. A flywheel uninterruptible power source as described in claim 18 wherein said drag on the flywheel is determined by said charging power or current to maintain speed.

25. A flywheel uninterruptible power source as described in claim 18 wherein said flywheel is charged by using power from an alternating current primary source.

26. A flywheel uninterruptible power source comprised of an energy storage flywheel supported for rotation on a bearing system and accelerated and decelerated using a brushless motor/generator for storing and retrieving energy, said flywheel uninterruptible power source prevents interruption of power to an electrical load during an interruption of primary power by supplying power generated from the flywheel generator, said flywheel is accelerated to normal operating speed using power from an alternating current primary source, said power from said primary source is rectified to direct current power which is supplied to a motor drive circuit that accelerates the motor, said direct current power supplied to the motor drive circuit is regulated by using switching regulation of the alternating current from the primary source for controlling the acceleration of the flywheel.

27. A flywheel uninterruptible power source as described in claim 26 wherein the motor drive circuit supplies single direction current to the motor coils.

* * * * *